UNITED STATES PATENT OFFICE.

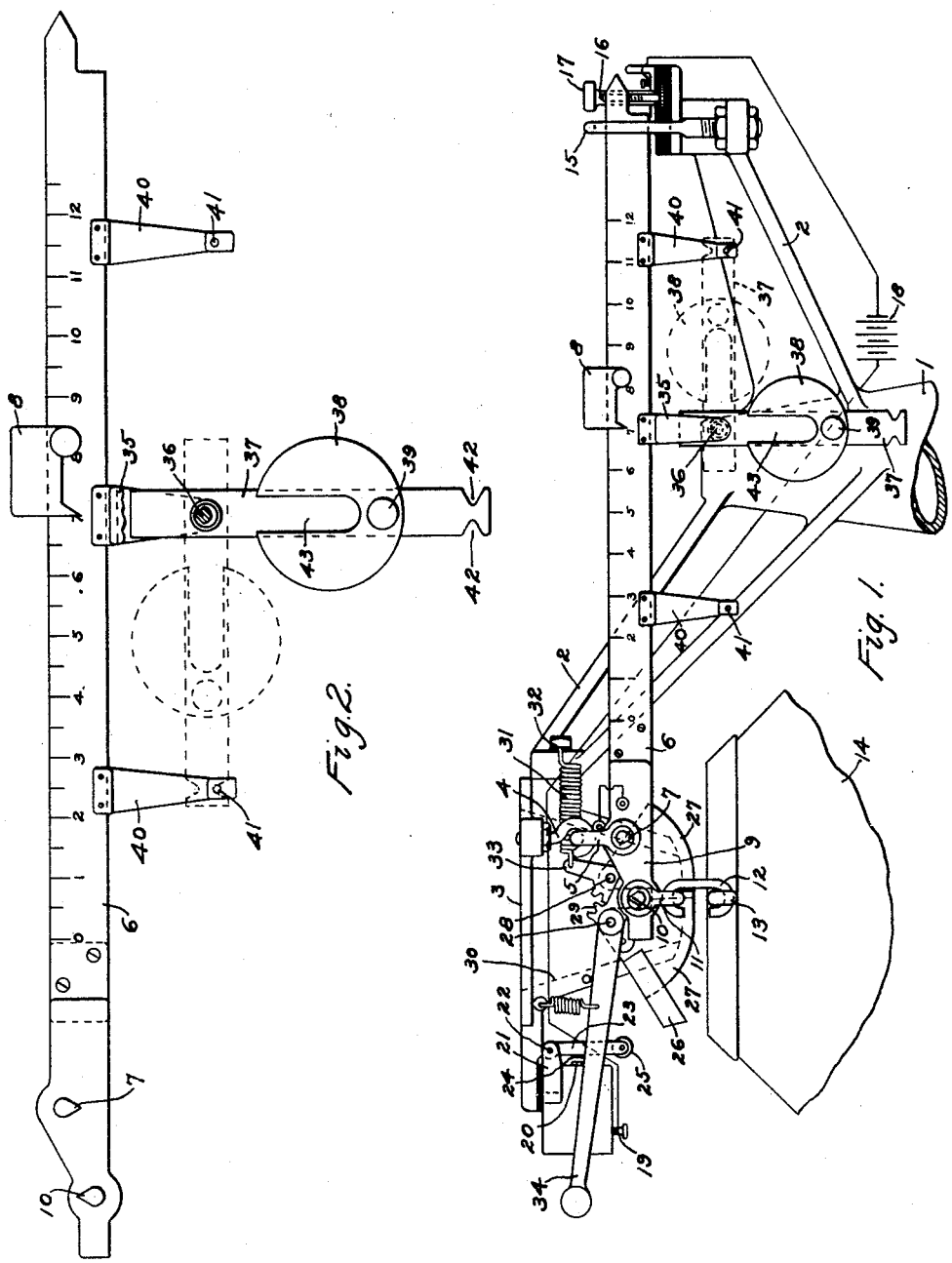

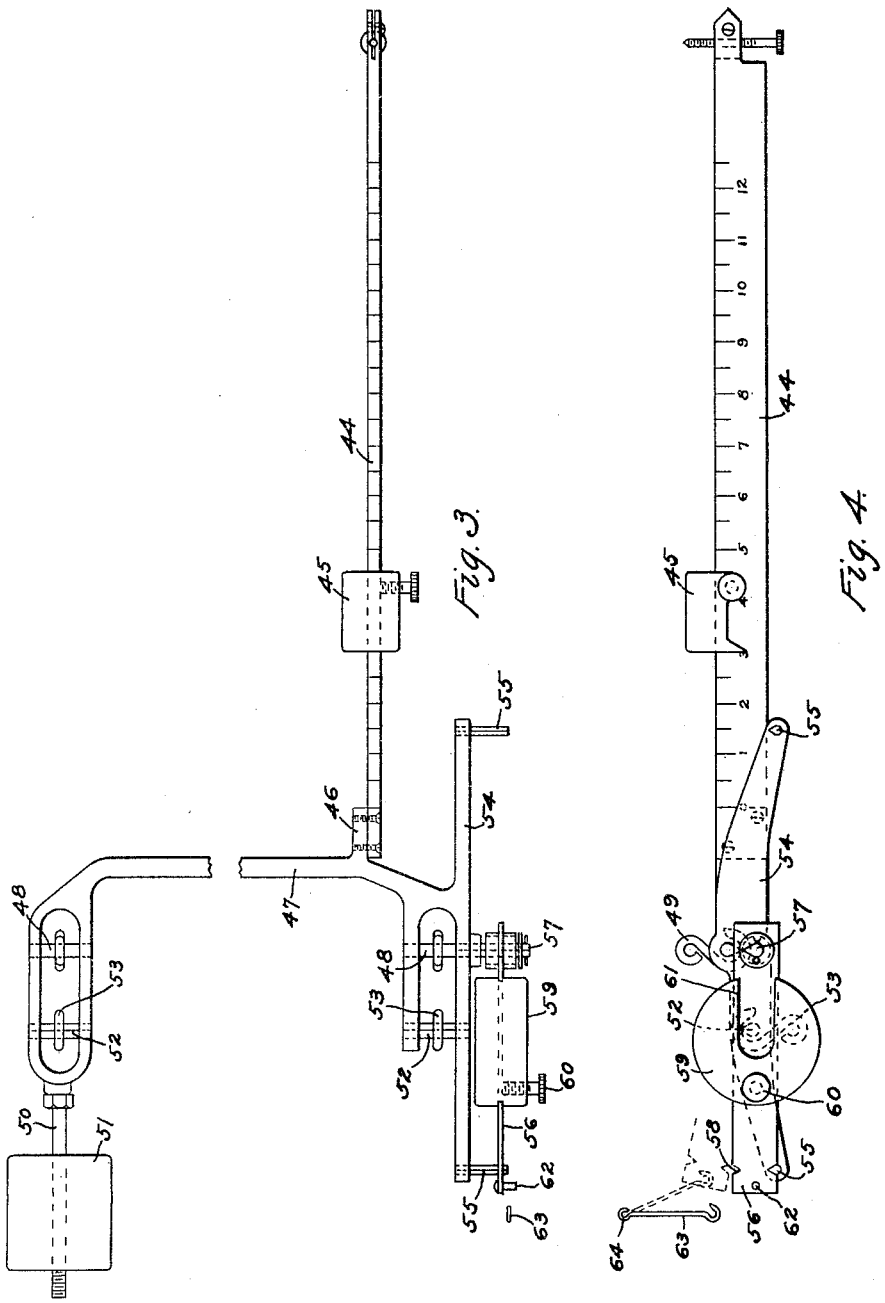

THOMAS J. STURTEVANT, OF WELLESLEY FARMS, MASSACHUSETTS, ASSIGNOR TO STURTEVANT MILL COMPANY, OF BOSTON, MASSACHUSETTS, A CORPORATION OF MAINE.

WEIGHING-MACHINE.

1,163,792.

Specification of Letters Patent.

Patented Dec. 14, 1915.

Application filed April 24, 1915. Serial No. 23,751.

*To all whom it may concern:*

Be it known that I, THOMAS J. STURTEVANT, a citizen of the United States, residing at Wellesley Farms, county of Norfolk, and State of Massachusetts, have invented an Improvement in Weighing-Machines, of which the following description, in connection with the accompanying drawings, is a specification, like letters on the drawings representing like parts.

The invention to be hereinafter described relates to weighing machines, and more particularly to weighing machines of the automatic type.

In machines of this general character, the material to be weighed passes through a gate or valve controlled passageway into the receptacle wherein it is weighed, and when the requisite weight of material has reached the receptacle, the beam to which it is usually connected, tilts upon its support or fulcrum, thereby, through suitable operating means, causing the gate or valve to close or shut the passageway to the further passage of material. When the passageway is closed there will yet remain some material "in the air" between such passageway and the receptacle, and in operating machines of the automatic type it has been found that an overweight of material is deposited in the weighing receptacle by reason of this column of material falling into the receptacle after the shut-off gate or valve has been closed.

Accuracy of weight is essential. If a slight overweight is placed in the weighing receptacle on each operation of the machine, it is readily seen that the aggregate overweight and consequent loss to the vender of the material for any series of operations will soon reach large proportions. On the other hand, should the quantity of material be underweight, a corresponding loss is sustained by the vendee or buyer. Both of these conditions are equally unsatisfactory and objectionable.

With these facts in mind, the aims and purposes of the present invention are to provide means whereby accuracy in weight of material through any series of weighing operations shall be insured.

An important feature of the present invention is the provision of a tare weight in a weighing system which can be adjusted to determine the overweight in any particular operation and can then, while fixed in adjusted position, be bodily swung to another position to accurately compensate for the overweight, so that in all subsequent weighing operations for the same material all danger of either overweight or underweight shall be entirely eliminated.

Another important feature of the invention consists in mounting the tare weight on a swinging arm pivoted to a beam of the weighing system, so that the arm and tare weight may be swung to a position to measure the overcharge and then be swung about the same axis to another position to compensate for the overcharge, so that in subsequent weighing operations for the same material accurate weight is insured.

These and other features of the present invention will best be made clear from the following description and accompanying drawings of one form of means for carrying the invention into practical effect, it being understood that changes may be made in the particulars and details of structure without departing from the true scope of the invention which is defined by the claims.

In the drawings: Figure 1 is a side elevation of one form of automatic weighing machine containing a good practical embodiment of the invention, some of the parts being broken away; Fig. 2 is an enlarged detached view of a beam of the weighing system showing the tare weight, its pivotal supporting arm, and the rests for the end of the arm secured to the beam; Fig. 3 is a plan view of a beam of the weighing system and a modified form of the present invention; and Fig. 4 is a side elevation of the parts shown by Fig. 3, with some of the details of the system omitted.

In the drawings the present invention is shown as associated with an automatic weighing machine wherein the gates or valves controlling the passage of material to the weighing receptacle are electrically controlled, but obviously, the invention can be used in connection with other forms of weighing machines, that illustrated being for the purposes of exploitation of the invention, and not as restricting its use.

Mounted upon a suitable supporting column 1 is a frame 2 having an overhanging arm 3 to which is secured a hook 4 carrying a link 5 for supporting the beam 6. The beam 6 may be of any usual construction and be sustained by the frame in any approved manner, but as shown in the drawings, it is provided with a knife edge bearing 7 for engaging the open lower portion of the link 5 and is provided, also, with a series of numbers indicating the pounds, and a sliding weight 8 which may be moved along the beam and secured in any desired position in accordance with the weight of the material desired, substantially as indicated in Fig. 1. The short arm 9 of the beam is provided with a knife edge bearing 10 for supporting the links 11 and 12, the latter of which is connected at 13 to a receptacle 14 in which the material to be weighed is placed. As usual in this character of machines, the short arm 9 may be duplicated at the opposite side of the machine and provided with a like knife bearing and link supports for the other side of the receptacle 14, but as such features are well understood by those skilled in the art, further illustration thereof is unnecessary.

From the character of construction thus far described, it will be apparent that when the weight 8 is adjusted to the number of pounds desired to be weighed in the receptacle 14, and the material is placed in the receptacle 14 to overbalance the weight 8, the beam 6 will turn about its knife edge supports as usual, thereby lifting its longer arm. Secured to the frame adjacent the end of the longer arm of the beam 6 is a stop 15 to limit the upward movement of the outer end of the beam. The outer end of the beam 6 carries an adjustable contact 16 which is adapted to engage an opposed contact 17 connected to one pole of a battery 18, when the outer end of the beam is raised by the weight in the receptacle 14. The opposite pole of the battery 18 is connected at 19 to an electromagnet 20, the ends only of which are indicated in Fig. 1; and pivotally connected to a bracket 21 at 22 is an arm 23 carrying an armature 24, the construction being such that when the electric circuit is completed, as will hereinafter more fully appear, the arm 23 will be drawn to the left, or swung toward the electromagnet. The lower portion of the arm 23 carries a roller 25 which is adapted to engage a projection 26 secured to one of the gates or valves 27. In the present form of the invention, there are two of these gates or valves 27 pivoted respectively at 28 and having interengaging segment gears 29, the construction being such that said gates 27 will open and close simultaneously. Leading into the space between the gates 27, 27, is a chute or hopper 30 through which the material to be weighed is passed, and the lower portions of the gates or valves 27 when in closed position as indicated in Fig. 1, close the passageway and interrupt the flow of material into the receptacle 14. A spring 31, one end of which is connected to the frame as at 32 and the other end to a lever arm 33 connected to one of the gates, serves to normally hold the gates in closed position, as indicated in Fig. 1; and connected to the other of said gates is a handle 34 whereby the gates may be opened and the projection 26 caused to engage above the roller 25 on the arm 23, whereby when the gates are thus in open position, the material fed into the chute 30 may pass uninterruptedly into the weighing receptacle 14. When the necessary weight of material has been deposited in the receptacle 14 to overbalance the weight 8, the beam 6 will be turned about its fulcrum 7, thereby closing the circuit, energizing the electromagnet 20 which thereupon attracts the armature 24 and withdraws the roller 25 from engagement with the projection 26, thus permitting the spring 31 to close the gates or valves 27 and interrupt or shut off the flow of material into the receptacle 14.

The parts which have been so far described may be of any appropriate and desired construction, the essential in this respect being that when the desired weight of material shall have been deposited in the weighing receptacle 14, the flow of material into the said receptacle shall be shut off or interrupted. Various machines have been devised for securing this result, and that illustrated in the present instance is typical of a class of such machines.

When the material in the receptacle 14 is sufficient to overbalance the weight 8 of the beam 6, and the gates or valves 27 are closed as hereinbefore indicated, there will still remain in the air a stream or column of material extending from the gates to the top of the material in the receptacle 14, and such column of material will constitute an overweight dependent upon the character of material itself and the length of the column thereof. It is the purpose of the present invention to provide means for compensating for this overweight or column of material; and as one means to this end, the weighing system is provided with a tare weight which may be supported from a beam of the system in swinging relation thereto, so that when in one position it may be adjusted to one side of its pivotal mounting to again bring the system into counterbalancing relation and then swung about the same pivotal mounting to an opposite position without disturbing its adjustment to thereby compensate for the additional charge of material falling into the hopper after the gates or valves are closed.

Depending from the beam 6 in the present instance of the invention, is a bracket 35, Fig. 2, carrying a knife edge bearing 36 upon which is pivotally mounted the tare arm 37. Slidably mounted upon the tare arm 37 is the tare weight 38 having means, such as the set screw 39, for adjustably securing the tare weight in any desired position on the tare arm. Extending from the beam 6 are the supports 40, one at each side of the pivotal support of the tare arm. These supports have rests 41 at their lower portion adapted to engage the notched portions 42 at the free end of the tare arm, the construction being such that the tare arm may be swung about its pivotal support 36 with the end of the tare arm resting upon either of the supports 41, substantially as indicated by dotted lines in Figs. 1 and 2, or said tare arm may be permitted to assume a substantially depending position.

The tare weight 38 is provided with a slotted portion 43 extending partway transversely thereof, and adapted to slide over the pivotal mounting of the tare arm for the purpose which will presently appear. The supports 40 in the present instance of the invention, are indicated as arms depending from the beam 6, the said arms being open at one side so that the end of the tare arm 37 when swung around its pivotal mounting 36, may be engaged with or disengaged from either one of said supports.

In operation, the tare beam may be permitted to swing into the depending position as indicated in Figs. 1 and 2, and the gates or valves 27 are opened as hereinbefore described, to allow the material to be weighed to pass into the receptacle 14; and when the amount of material in the receptacle 14 is sufficient to overcome the counterbalance of the weight 8 on the beam 6, the longer arm of said beam will rise, close the circuit, and cause the gates or valves 27 to be shut, thereby interrupting the passage of material into the receptacle. Thereafter the column of material extending from the gates or valves 27 to the top of the material in the receptacle 14 will pass into the receptacle and an overcharge of material will consequently be thus placed in the receptacle 14. The tare arm 37 is then swung about its pivotal mounting into the position indicated by dotted lines in Fig. 1, with the end of the tare arm resting upon the outer support 40. The tare weight is then adjusted longitudinally of the tare arm until the system is again brought into counterbalance, whereupon the tare weight is fixedly secured to the tare arm by means of the set screw 39. Before commencing subsequent weighing operations, the tare arm 37 with the tare weight still held in fixed adjusted position, is swung into the dotted line position, Fig. 2, that is, to the opposite side of the pivotal mounting of the tare arm. In this position the tare weight 38 as will be evident, will compensate for the overcharge or column of material between the gates or valves 27 and the top of the material in the receptacle 14 during subsequent weighing operations of the same material. It will be noted that when the tare weight 38 has been adjusted on the tare arm 37 after the first weighing operation, to again bring the system into counterbalance, it is fixed and secured in such position on the tare arm so that when the tare arm is swung about its pivotal mounting with respect to the beam 6, the accuracy of compensation for the column of material between the gates or valves 27 and the top of the receptacle 14, or in other words for that column of material in the air, is not disturbed. In the present instance, the tare arm and tare weight are shown as being supported from the weigh beam and pivotally associated therewith; but it is to be understood, of course, that any beam of the system may serve to support the tare arm and tare weight and the end sustaining means for the tare arm, but the construction above described has been found to be simple, convenient, and practical, without the addition of another beam to the system; and the term "beam" as here employed, and used in the claims, is to be understood as including not only the weigh beam, but any other suitable beam in the weighing system.

Various modifications and changes may be made in the details and the relative association of parts without departing from the real invention, and one such modified form of the invention is indicated in Figs. 3 and 4, which will now be described.

In Fig. 3, the weigh beam 44 is provided with the usual graduations and sliding weight 45, and its inner end is connected at 46 to a yoke 47 which conveniently typifies a dual construction for supporting the weigh beam. To this end the yoke 47 has knife bearing supports 48 by which the weigh beam and the yoke may be suspended through the links or hooks 49 from a suitable supporting means. Secured to the yoke 47 and projecting therefrom, is a rod 50 on which the usual counterweight 51 may be applied, the construction being such that the weight 51 may act as a counterbalance to bring the system into equilibrium, as will be well understood by those skilled in the art. The side members of the yoke 47 are also provided with the knife edge bearings 52 from which the weighing receptacle may be suspended, as by the hooks or links 53. In the modified form of the invention, the yoke 47 is provided with a side portion 54 having the end rests 55 for the ends of the tare beam 56 which is itself pivotally mounted at 57 in the vertical plane passing through the knife edge bearings 48 of the weigh beam, the construction being such that the tare arm 56 may be swung around its pivotal mounting at 57 and have its notched end portion 58 rest upon either of the supports 55. The tare arm 56 in the modified form of the invention, is also provided with the tare weight 59, and a clamp or set screw 60 whereby the tare weight may be adjusted longitudinally on the tare arm and secured in adjusted position, the slot 61 in the tare weight 59 enabling the tare weight to be moved with respect to the pivotal support 57 to bring the center of the tare weight in vertical alinement with the axis of the pivotal support 57, substantially as hereinbefore described.

From the construction indicated in Figs. 3 and 4, it will be evident that when the weight of the tare beam and tare weight is sustained by the pivotal support 57 alone, the tare weight and arm have no influence upon the weighing system; and as one means of thus transferring the weight to the pivotal support 47, the tare arm 56 may be provided near its free end portion, with means for engaging an exterior support in order to hold the free end of the tare arm out of contact with the tare arm support 55. As one means to this end, the tare arm 56 may be provided with a pin 62 which is adapted to engage a hook 63 pivoted at 64 to a fixed part of the frame, the construction being such that when the tare arm is lifted from its end support 55 and engaged with the hook 63, as indicated by dotted lines in Fig. 4, the tare arm and tare weight will have no effect upon the weighing system.

In the operation of a weighing system provided with the modified form of the invention, the tare arm 56 will be lifted and engaged with the hook 63 as indicated in Fig. 4, and material will then be permitted to flow into the weighing receptacle sustained from the beam 44 which, when the receptacle has received the amount of material necessitated by the weight 45, will be tilted about its supports 48, the gates or valves will be closed as hereinbefore described, and thereafter the material in the air, or the column of material between the gates and the top of the material in the weighing receptacle, will pass into the latter. The tare arm 56 will then be swung about its pivotal mounting 57 with its free end resting upon the support 55 at the weight side of the weigh beam support, or to the right, Fig. 4, and the tare weight 59 will then be adjusted on the tare arm to bring the system into counterbalance or equilibrium. The tare arm with the tare weight fixed in adjusted position, will then be turned to bring its end portion to rest upon the support 55 at the opposite side of the weigh beam fulcrum, or as shown by full lines in Fig. 4, to compensate for the column of material in the air. Thereafter during the weighing of the same material the tare weight will compensate for the material in the air which passes into the weighing receptacle 14 after the gates or valves have shut off the flow of material into said receptacle.

From the constructions described as good practical forms of the present invention, it will be noted that the tare weight is supported to swing about a fulcrum upon a beam of the system into two positions, one at each side of said fulcrum, and that when in one position, the tare weight may be adjusted to weigh the material that will be in the air, and thereafter swung to its other position to compensate for such material during subsequent weighing operations. This is an important feature of the present invention, because when once the tare weight has been adjusted to the weight of the material in the air, as hereinbefore described, it can be swung into position to compensate for such material with absolute accuracy, and I believe I am the first in the art to provide a swinging tare weight discharging the swinging functions stated.

What is claimed is:—

1. In a weighing system, the combination of a scale beam provided with a weighing receptacle and an adjustable weight for weighing material placed in said receptacle, a tare weight pivotally connected to the scale beam and movable to a position at one side of its pivotal connection to weigh the excess of material placed in said receptacle after the scale beam has been tipped and movable to another position on the opposite side of its pivotal connection to compensate for such material in subsequent weighing operations.

2. In a weighing system, the combination of a scale beam provided with a weighing receptacle and an adjustable weight for weighing material placed in said receptacle, means for delivering material to said receptacle, automatic devices for stopping delivery of material from said means to said receptacle, and a tare weight pivotally related to the scale beam to assume three positions, one a neutral position during the initial weighing operation, another position to weigh the material in the air after the flow of material by the delivery means has been stopped, and a third position to compensate for such excess of material.

3. In a weighing machine, the combination of a scale beam, a weighing receptacle, an adjustable weight for weighing material placed in said receptacle, a tare arm pivotally connected to the scale beam to swing in a vertical plane to three different positions, one a neutral position to permit the adjustable weight to determine the amount of material placed in said receptacle, another position to weigh the material placed in said receptacle after the scale beam has been tipped, and a third position to compensate for the excess of material placed in said receptacle after the beam has been tipped.

4. In a weighing machine, the combination of a beam, a tare arm connected to said beam to swing to either of two positions at opposite sides of said connection, and a tare weight having a slot or opening permitting said tare weight to be adjusted on the tare arm to place the center of gravity of the tare weight in alinement with the swinging support of the tare arm.

5. In a weighing machine, the combination of a pivotally supported beam, a tare arm pivotally connected to the beam in the vertical plane passing through the beam support, a tare weight carried by said arm, and means for supporting the free end of the tare arm from the beam with the tare weight at either side of the pivotal connection of the tare arm with the beam.

6. In a weighing machine, the combination of a pivotally supported beam, a tare arm pivotally connected to the beam in the vertical plane passing through the beam support, a tare weight carried by said arm, means for securing the tare weight in adjusted position on said arm, and means for supporting the free end of the tare arm from the beam with the tare weight at either side of the pivotal connection of the tare arm with the beam.

7. In an automatic weighing machine, the combination of a weigh beam, a weighing receptacle connected to said beam, gates or valves for controlling the passage of material to said weighing receptacle, means for closing the gates or valves when the beam is tilted by the material placed in said receptacle, a swinging tare arm pivotally connected to said weigh beam and carrying a tare weight, and means for supporting the free end of the tare arm from the beam at one side of its pivotal connection to measure the material falling into the said receptacle after the gates or valves have been closed, and means for supporting the tare arm from the beam to compensate for the excess of material placed in said receptacle.

In testimony whereof, I have signed my name to this specification, in the presence of two subscribing witnesses.

THOMAS J. STURTEVANT.

Witnesses:
BEATRICE I. SMITH,
ELLEN B. TOMLINSON.

Copies of this patent may be obtained for five cents each, by addressing the "Commissioner of Patents Washington, D. C."